United States Patent [19]

Mori

[11] 4,304,509

[45] Dec. 8, 1981

[54] THROW AWAY INSERT

[75] Inventor: Yoshikatsu Mori, Itami, Japan

[73] Assignee: Sumitomo Electric Industries, Ltd., Osaka, Japan

[21] Appl. No.: 142,616

[22] Filed: Apr. 21, 1980

[30] Foreign Application Priority Data

May 10, 1979 [JP] Japan .................................. 54-57794

[51] Int. Cl.³ .............................................. B26D 1/00
[52] U.S. Cl. .................................................... 407/114
[58] Field of Search .......................................... 407/114

[56] References Cited

U.S. PATENT DOCUMENTS

| 3,187,406 | 6/1965 | Franko | 407/114 |
| 3,815,192 | 6/1974 | Ohtsu et al. | 407/114 |
| 4,065,223 | 12/1977 | Nelson | 407/114 |
| 4,214,845 | 7/1980 | Mori | 407/114 |

Primary Examiner—Harrison L. Hinson
Attorney, Agent, or Firm—Wenderoth, Lind & Ponack

[57] ABSTRACT

An improved throw away insert is disclosed which can break chips satisfactorily in cutting by use of a large part of the cutting edge. It is provided with a large chip breaker projection and a plurality of small chip breaker projections disposed between each nose portion and the large projection.

3 Claims, 10 Drawing Figures

U.S. Patent    Dec. 8, 1981    4,304,509
FIG.1(a) PRIOR ART   FIG.1(b) PRIOR ART   FIG.2(a) PRIOR ART   FIG.2(b) PRIOR ART
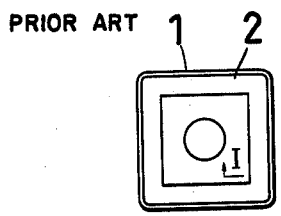 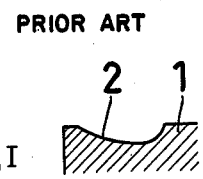 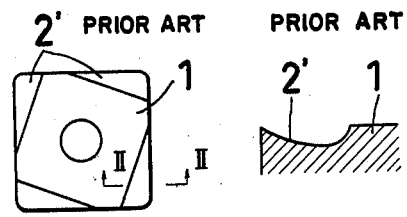 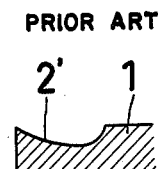
FIG. 3
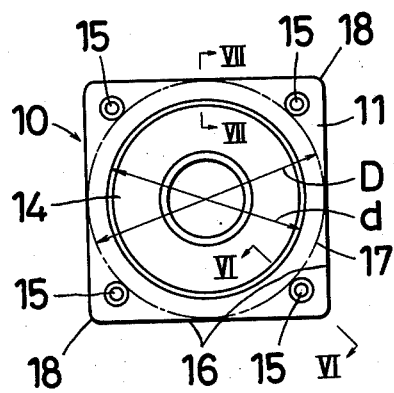
FIG. 5
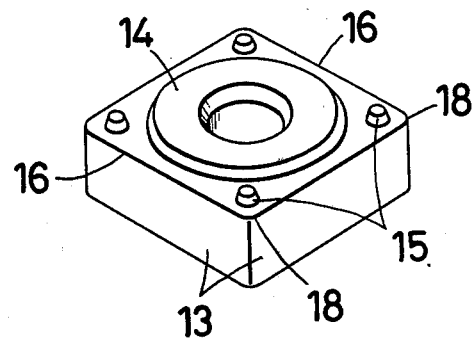
FIG. 4
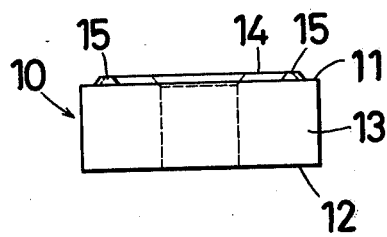
FIG. 6
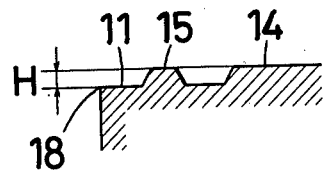
FIG. 7
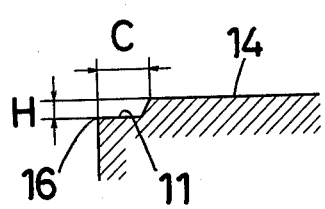
FIG. 8
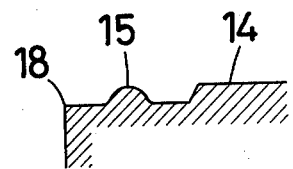

THROW AWAY INSERT

The present invention relates to an improved throw away insert which can break chips satisfactorily, especially when a large part of the cutting edge is engaged for cutting.

For efficient cutting of a workpiece, effective chip control is required. In order to serve this purpose, throw away inserts provided with various chip breaking means have been proposed.

The throw away inserts shown in FIGS. 1 and 2 are representative ones of such conventional inserts. The insert 1 of FIG. 1 has a chip breaking groove 2 of a uniform width along and over the entire length of the cutting edge. The insert of FIG. 2 has a chip breaking groove 2' extending from each nose with its width gradually decreasing. These prior art inserts have chip breaking grooves designed to cause the chips to curl with desired curvatures to help them break.

Such chip breaking grooves are effective when the depth of cut is about one third to one half of the length of each cutting edge and the feed rate is relatively large. But, they can not break satisfactorily thin chips produced in cutting by use of the entire length of the cutting edge wherein the feed rate is relatively small.

Chips produced in cutting with small depth of cut are relatively easy to curl and break due to the effect of nose portion even if they are rather thin. However, chips produced in cutting with large depth of cut are not guided by the breaker groove sufficiently well to curl with a desired radius of curvature. With the insert of FIG. 1 having a breaker groove of a uniform width, the chips produced touch the breaker groove 2 over their entire width so that the chip breaking force given by the groove is undesirably distributed. The same is also true for the insert of FIG. 2 having breaker grooves of varying width through the chips are deformed slightly in this case. These inserts allow the chips to come uncurled and sometimes wind round the tool holder or other parts, hindering the cutting operation. These troubles occur frequently also when only the central portion of a cutting edge is used, such as in chamfering.

In order to solve this disadvantage, a chip breaker is required which can deform chips only partially in such type of cutting. Chip breakers with small projections have been proposed for this purpose, but they are not so effective to break chips when the thickness of chips produced is small.

An object of the present invention is to provide a throw away insert which can control thin chips satisfactorily as well as thick chips.

Other features and advantages of the present invention will become apparent from the following description taken with reference to the accompanying drawings, in which:

FIG. 1a is a plan view of an example of conventional throw away insert;

FIG. 1b is an enlarged sectional view thereof taken along the line I—I of FIG. 1a;

FIG. 2a is a plan view of another example of conventional throw away insert;

FIG. 2b is an enlarged sectional view thereof taken along the line II—II of FIG. 2a;

FIG. 3 is a plan view of a throw away insert according to the present invention;

FIG. 4 is a side view thereof;

FIG. 5 is a perspective view thereof;

FIG. 6 is an enlarged sectional view thereof taken along the line VI—VI of FIG. 3;

FIG. 7 is an enlarged sectional view thereof taken along the line VII—VII of FIG. 3; and FIG. 8 is a sectional view similar to FIG. 6 of another embodiment.

Referring to FIGS. 3–7 illustrating a preferred embodiment of the present invention, a throw away insert generally designated by numeral 10 is of a negative type having a top flat surface 11 which is a rake face, a bottom surface 12 substantially parallel to the top surface, and side surfaces 13 at right angle to the top and bottom surfaces. The throw away insert 10 according to this invention is characterised in that it has on its top surface a truncated conical projection 14 and a plurality of small projections 15, both of said projections serving as chip breakers. The throw away insert 10 has a plurality of cutting edges 16 extending along all the edges where the top surface 11 meets the side surfaces 13.

The projection 14 is concentric with an imaginary circle 17 inscribed to the four cutting edges on the top surface and has a diameter about 0.5 to 3 mm smaller than the diameter D of the inscribed circle 17. Its height H is about 0.1 to 1 mm larger than the cutting edge 16 (FIG. 6). The distance between the projection 14 and each cutting edge 16 is the smallest at the middle of each side and increases gradually toward each nose portion 18.

The projection 14 does not function satisfactorily to break chips in cutting by use of a nose portion of the insert because the distance between the nose and the projection 14 is too large to break the chips. To counteract this problem, a small projection 15 is provided on the top surface 11 between each nose and the projection 14 in addition to the large projection 14. The small projections 15, too, are truncated conical and have substantially the same height as the large projection 14 as will be seen from FIG. 6. The small projections 15 can cause any chips starting from the nose portion to deform or curl satisfactorily. The small projections 15 may be hemispherical as shown in FIG. 8 instead of being truncated conical.

The throw away insert according to the present invention ensures that the chips, even thin ones, are satisfactorily brought into contact with the small projection 15 or the large projection 14 so as to curl themselves easily. Because only part, not the entire surface, of the chips touches the breaker projection, an ideal chip breaking force is given to the chips for secure breaking of the chips.

To throw away insert according to the present invention is very efficient for chip breaking in ordinary cutting operation as well as in cutting wherein a large part of the cutting edge is engaged for cutting, e.g. in cutting with a large depth of cut and in champfering.

Although the preferred embodiment is a square insert, the present invention is applicable to inserts of other forms such as triangular and rhombic inserts, too.

Although the preferred embodiment is of a negative type, the present invention is applicable to inserts of a positive type. It is also applicable to inserts of a negative type which permits the use of both surfaces. For such types of inserts, a large projection 14 and small projections 15 may be provided on both the top and bottom surfaces.

What I claim:

1. A throw away insert having a top surface, a bottom surface substantially parallel to said top surface, and a plurality of side surfaces, at least one of the top and bottom surfaces forming a rake face, a plurality of cutting edges extending along the edges where the top surface meets the side surfaces, a first chip breaking projection formed on said rake face, said first projection being truncated conical and concentric to a circle inscribed to all the cutting edges and having a diameter of about 0.3 to 3 millimeters smaller than the diameter of said inscribed circle and being about 0.1 to 1 millimeter above the cutting edge, and a plurality of second chip breaking projections disposed between each nose portion of the insert and said first projection.

2. A throw away insert as claimed in claim 1 wherein said second chip breaking projections are truncated conical and have substantially the same height as the first chip breaking projection.

3. A throw away insert as claimed in claim 1 wherein said second chip breaking projections are hemispherical.

* * * * *